United States Patent [19]
Lipeles

[11] Patent Number: 5,549,360
[45] Date of Patent: Aug. 27, 1996

[54] MINIMUM WEIGHT WHEEL RIM

[76] Inventor: Jay L. Lipeles, 316 Spring Run Cir., Longwood, Fla. 32779

[21] Appl. No.: 291,519

[22] Filed: Aug. 15, 1994

[51] Int. Cl.$^6$ .................................................. B60B 5/02
[52] U.S. Cl. ............................................ 301/64.7; 301/95
[58] Field of Search .......................... 301/64.7, 95, 96, 301/97, 98, 104

[56] References Cited

U.S. PATENT DOCUMENTS

| | | | |
|---|---|---|---|
| 3,528,706 | 9/1970 | Bauer | 301/65 |
| 4,146,274 | 3/1979 | Lejeune | 301/65 X |
| 4,511,184 | 4/1985 | Schauf et al. | 301/104 X |
| 4,749,235 | 6/1988 | McDougall | 301/64.7 |
| 4,793,659 | 12/1988 | Oleff et al. | 301/64.7 |
| 4,930,844 | 6/1990 | Giroux | 301/64.7 |
| 4,995,675 | 2/1991 | Tsai | 301/64.7 |
| 5,184,874 | 2/1993 | Olson et al. | 301/64.7 |

*Primary Examiner*—Russell D. Stormer

[57] ABSTRACT

A design arrangement is given, by means of which, the weight of a composite wheel rim may approach minimum. This is accomplished by locating high strength fiber bundles at extremes of the section. At other, less critical locations in the section less dense reinforcing fibers are used to save weight. Variations of this arrangement are applicable to a wide variety of wheels (i.e., bicycle, automobile, motorcycle, airplane, etc.).

7 Claims, 4 Drawing Sheets

MINIMUM WEIGHT WHEEL RIM

BACKGROUND OF THE INVENTION

This invention relates to a composite wheel rim of minimum weight. In this context, minimum weight means the least weight for a wheel rim of a given size, style and strength. Style, in this context implies the design loads and design criteria.

In structural design, minimum weight is achieved when every point in the structure has the same Margin of Safety with respect to stress. When a wheel rim is made of a single ordinary metal, or other quasi-isotropic material, this implies that the stress is the same everywhere. To achieve this condition the rim cross-section is designed to have more material at locations where the load is great and less material where the load is less. In principle the rim cross-section will be reduced or enlarged in accordance with the load at each point.

However, in practice locations requiring little material to carry the load at that point will not be accordingly reduced for other than structural considerations. An element reduced to the minimum needed to carry its load might be too thin (or light or small, etc.) to be handled easily during fabrication. It might be a non-standard gauge or be excessively expensive (or difficult) to make. In such cases excess material finds its way into a design and the wheel rim weight is greater than the minimum required.

The use of composites in the design of structural elements has resulted in a substantial weight savings (in many cases) owing to the low density of the fibers and resins employed. Advanced development attendant on the success of composite designs has brought a ever widening variety of fibers available and with it a range of mechanical properties. Some of the high strength fibers are: graphite, Kevlar (a trademark of DuPont Co.), Boron and several ceramics (i.e. Alumina, Silicon Carbide, Silicon Nitride, Titanium Carbide, etc.). Spectra (a trademark of Allied Signal Inc.) is an example of a low density fiber.

In the early days of composite design, graphite was the fiber of choice for high performance because it was the least dense (of the high performance fibers) as well as having the highest strength to weight ratio. Recently, however, fibers have been developed (i.e., Spectra) that are very strong and much less dense than graphite.

A stylized drawing of the cross-section of a conventional wheel rim is shown in FIG. 1 which includes a pair of rim flanges 10 and a web portion 12. Although thicknesses may vary within the section, material properties are generally uniform (depending on limitations of the manufacturing process). However, the internal load distribution of a wheel rim is due, primarily, to in-plane bending. There are occasions (e.g., banked turns or asymmetrical bumps) when it is also subjected to out-of-plane bending and torsion. Bending stress is proportional to the section modulus (c/I) where:

c—the distance from the neutral axis

I—area moment of inertia about the neutral axis

In-plane bending stress is therefore proportional to $c_y/I_x$ and is maximum for maximum $c_y$. Similarly, out-of-plane bending stress is proportional to $c_x/I_y$ and is maximum for maximum $c_x$. A section subjected to bending therefore resists most of the load at its extreme fibers (maximum $c_x$ and $c_y$). Intervening material resists shear but serves primarily to transfer load between the extremes.

Torsion will be resisted by the section as a whole and by differential bending of all bundles. Differential bending can best be understood by considering the internal loading on an individual fiber bundle. A torsional load imposed on the wheel rim can be decomposed into one or more couples. The shear loads that comprise these couples will load the fiber bundles in transverse shear and they will bend in response. Each fiber bundle will bend differently in accordance with the shears imposed on it. This effect is referred to as differential bending. The aggregate effect of differential bending is a torsional capacity, that is, an ability to resist torsion.

When a section is loaded in bending, the fibers on one side of the neutral axis are put into compression and those on the other side, in tension. The tensile and compression loads are equal, they balance one another.

FIGS. 3A–3F illustrate several different shapes the reinforcing bundles can take. From a structural perspective the preferred form is circular (FIGS. 3B and 3F). It is, structurally, the most efficient. Other considerations (aerodynamics, aesthetics, ease and cost of manufacture, etc.) may impel alternate shapes and some of those are shown in FIGS. 3A, C, E and F.

The primary fiber reinforcing bundles will resist most of the load because of their placement. However, there is an additional effect that results in further optimization. Internal loads tend to distribute in accordance with stiffness. That is, the stiffest load path takes the greatest load. The highest strength fibers are usually also the stiffest. The internal loads will therefore concentrate at the extremes more than they would be if the section had uniform material properties. This will allow the use of less material between the extremes and result in further weight reduction.

SUMMARY OF THE INVENTION

The three fiber reinforcing bundles of FIG. 2 are to be a composite reinforced with a high strength fiber. At the present state of the art in fiber development that would be a Boron or graphite fiber. The reinforcement in the intervening material is to be the least dense material that can sustain the remaining load. At the present time that would be one of the Spectra fibers. Other fibers may be incorporated as they are developed, to obtain better mechanical properties, a smoother transition of properties, to reduce cost or for ease of manufacture.

The three primary reinforcing bundles are to be configured with their fibers oriented in the circumferential direction. This requirement may be compromised slightly to accommodate handling or fabrication considerations. The intervening section fibers may be woven tape, continuous or chopped fibers configured to approach quasi-isotropic properties.

DESCRIPTION OF THE PREFERRED EMBODIMENT

Figure 1:
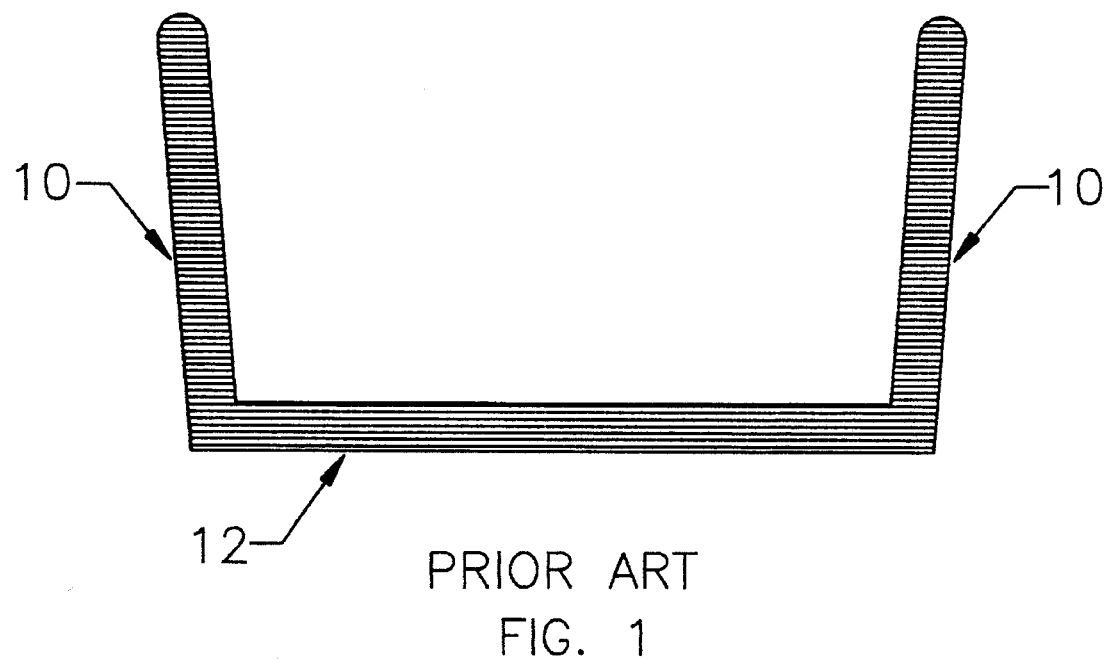
FIG. 1 shows the cross-section of a stylized, conventional art wheel rim.
Figure 2:
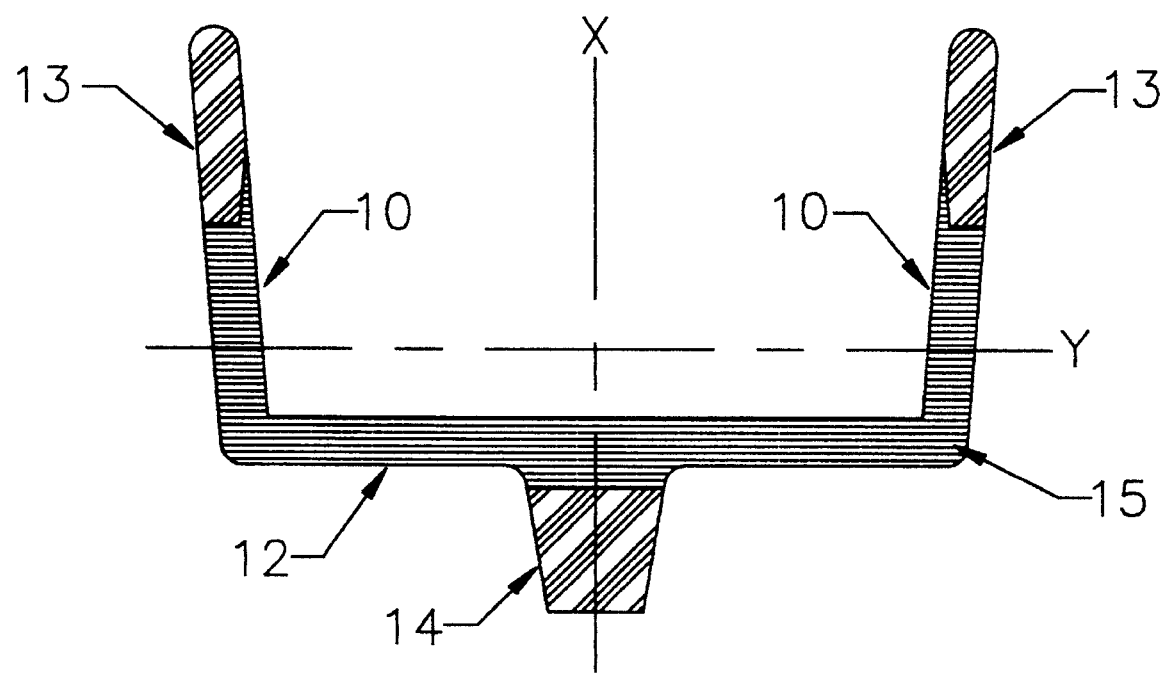
FIG. 2 shows the cross-section of a stylized, minimum weight wheel rim.
Figure 3A:
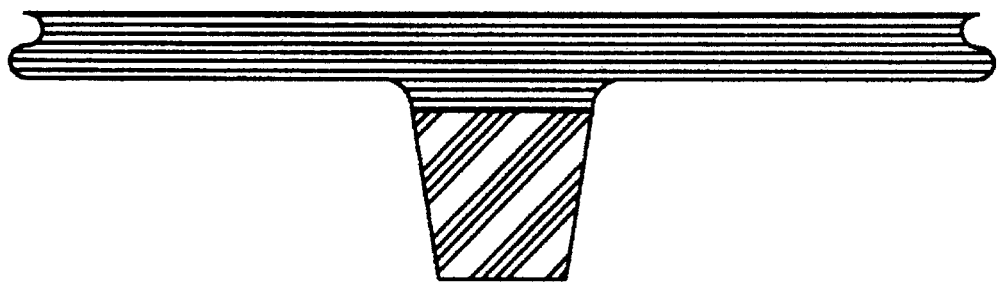
FIGS. 3A–3F shows the cross-section of some alternate reinforcement bundle forms.
Figure 3B:
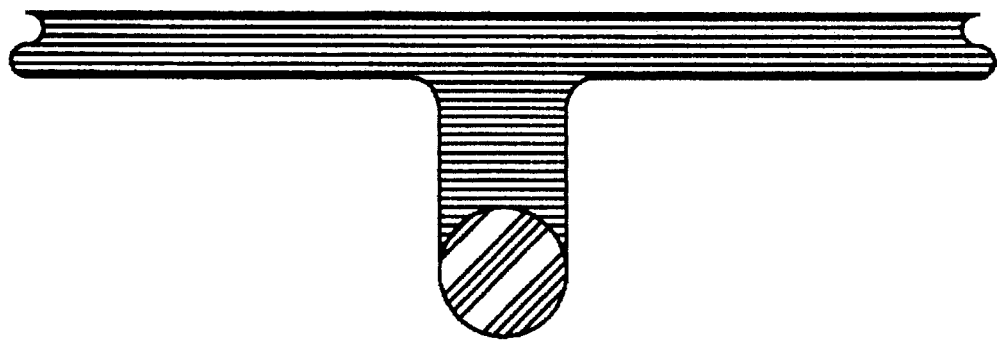
Figure 3C:
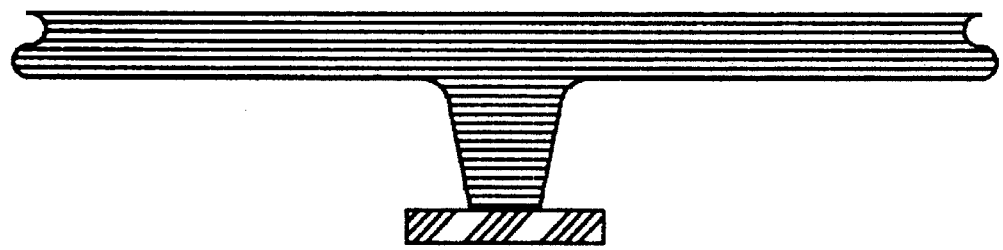
Figure 3D:
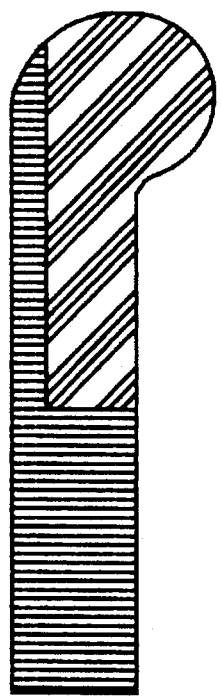
Figure 3E:
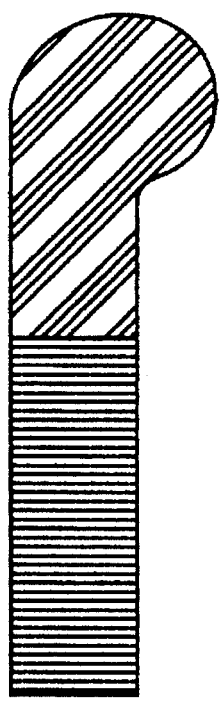
Figure 3F:

A section that approaches minimum areal density must have its strongest fibers at the section extremes. FIG. 2 shows a basic wheel rim that has been so optimized. Less dense reinforcing fibers (so long as they can sustain the loads imposed) can be tolerated between the extremes. By utilizing the least dense material to the greatest allowable extent (consistent with strength requirements), the section areal density will be reduced and the resulting rim weight will approach minimum.

Fiber bundles 13 and 14 are at the extremes of the rim flanges as shown in FIG. 2 with respect to the y-axis. High strength fibers located in these areas will maximize the section properties with respect to in-plane bending, (i.e., the plane of the wheel) the primary loading condition. The reinforcing bundles 13 and 14 sustain most of the load. Intervening material 15 need be less strong and a minimal density material is preferred in this area.

Fiber bundles 13 (see FIG. 2) are also at the extremes of the section with respect to the x-axis. High strength fibers in these areas will maximize section properties with respect to out-of-plane bending. Torsion will be resisted by the section as a whole and by differential bending of all bundles.

Optimal design of the various bundles may result in a variety of bundle shapes. For example, differing loads in the in and out-of-plane directions result in different strength requirements. Mountain bikes are subjected to much more severe conditions than road bikes. In particular their wheels are subjected to large lateral and torsional loads. The greater strength required demands larger reinforcing bundles. Optimal design of the flanges for those conditions will yield bundles such as those shown in FIGS. 3A–3F. Balancing bundles 13 against bundle 14 can be achieved in a variety of ways, some of which are also shown in FIGS. 3A–3F.

Figure 4A:
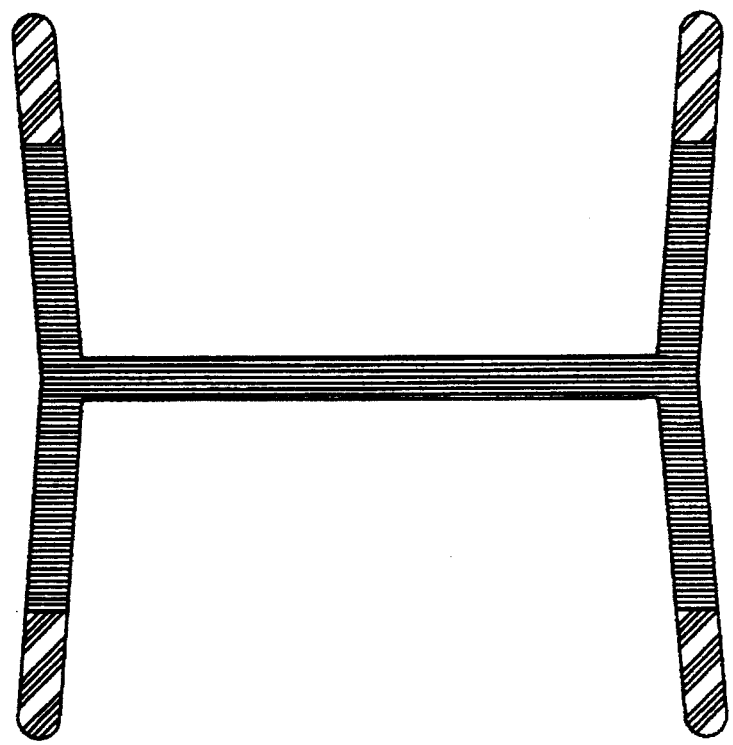
FIGS. 4A & 4B shows the cross-section of wheel rims with more than three reinforcing bundles.
Figure 4B:
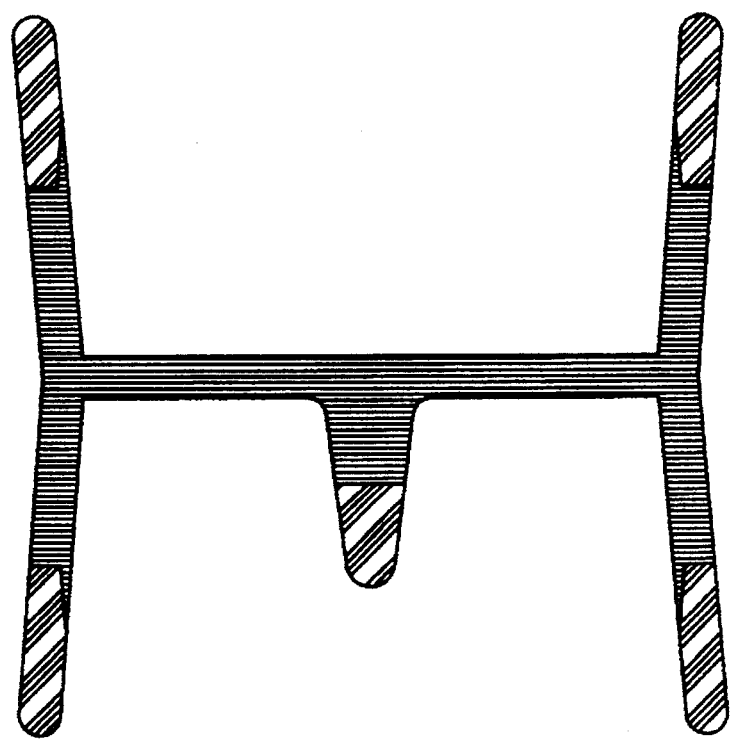

The need for maximum out-of-plane bending strength, such as occurs with a mountain bike wheel, may demand an alternate form, an example of which is shown in FIG. 4A. In this case, the material of bundle 14 has been split in half and the two halves spread apart to maximize the lateral bending strength. FIG. 4B is a compromise between FIG. 2 (a road wheel) and FIG. 4A (a mountain or BMX wheel). In it the bundle 14 is divided into three parts. The first part is left in the center and the remaining two are spread apart as in FIG. 4A to obtain a wheel whose lateral strength is between that of FIG. 2 and FIG. 4A.

I claim:

1. A composite wheel rim for a wheel comprising a web portion and a pair of rim flanges extending from the web portion to peripheral extremities;

the composite rim comprising at least two different types of reinforcing fibers to strengthen the rim;

said reinforcing fibers comprising fibers of higher density disposed at the extremities of the rim flanges, the remainder of the rim comprising fibers of lower density.

2. The wheel rim of claim 1 further comprising:

a reinforcing extremity extending radially inward from the base of the rim on a side opposite the rim flanges, said reinforcing extremity comprising higher density fibers.

3. The wheel rim of claim 1 further comprising:

at least two reinforcing extremities extending from the web of the rim on a side opposite the rim flanges, said reinforcing extremities each comprising higher density fibers.

4. The wheel rim of claim 3 wherein:

the number of reinforcing extremities is three.

5. The wheel rim of claim 1 wherein:

the higher density fibers utilized for the extremities of the rim are taken from the group consisting of: graphite, boron, alumina, silicon carbide, silicon nitride, titanium carbide, and Kevlar.

6. The wheel rim of claim 1 wherein:

the lower density fibers comprise a Spectra fiber.

7. A composite wheel rim for a wheel comprising a web portion and a pair of rim flanges extending from; the web, said rim flanges having peripheral extremities;

the composite rim comprising at least two different types of reinforcing materials;

a first reinforcing material having a density that is higher than a second reinforcing material;

the first reinforcing material being selected from the group consisting of alumina, silicon carbide, silicon nitride, and titanium carbide;

the second reinforcing material comprising fibers;

wherein the first reinforcing material is disposed at the extremities of the rim flanges and the remainder of the rim comprises the second reinforcing material.

\* \* \* \* \*